United States Patent
Smith

(10) Patent No.: US 11,608,916 B2
(45) Date of Patent: Mar. 21, 2023

(54) VIBRATION DAMPING CONNECTOR SYSTEMS

(71) Applicant: Edwards Limited, Burgess Hill (GB)

(72) Inventor: Paul David Smith, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 1049 days.

(21) Appl. No.: 16/318,609

(22) PCT Filed: Jul. 17, 2017

(86) PCT No.: PCT/GB2017/052097
§ 371 (c)(1),
(2) Date: Jan. 17, 2019

(87) PCT Pub. No.: WO2018/015727
PCT Pub. Date: Jan. 25, 2018

(65) Prior Publication Data
US 2019/0285209 A1 Sep. 19, 2019

(30) Foreign Application Priority Data
Jul. 18, 2016 (GB) .................................... 1612406

(51) Int. Cl.
*F16L 23/00* (2006.01)
*F04D 29/66* (2006.01)
(Continued)

(52) U.S. Cl.
CPC .......... *F16L 23/006* (2013.01); *F04D 19/042* (2013.01); *F04D 29/601* (2013.01);
(Continued)

(58) Field of Classification Search
CPC ....... F16L 23/006; F16L 23/02; F04D 19/042; F04D 29/601; F04D 29/668; F16F 7/108; F16F 2226/04
See application file for complete search history.

(56) References Cited

U.S. PATENT DOCUMENTS 3,517,951 A * 6/1970 Dunmire ................. F16L 21/04
285/348
4,036,512 A * 7/1977 Francis ................. F16L 17/035
285/369
(Continued)

FOREIGN PATENT DOCUMENTS

DE  202005011679 U1  10/2005
EP  2918843 A1  9/2015
(Continued)

OTHER PUBLICATIONS

Japanese Office Action dated Apr. 1, 2021 for corresponding Japanese application Serial No. JP2019502623, 3 pages.
(Continued)

*Primary Examiner* — Robert A. Siconolfi
*Assistant Examiner* — James K Hsiao
(74) *Attorney, Agent, or Firm* — Theodore M. Magee; Westman, Champlin & Koehler, P.A.

(57) ABSTRACT

A vibration damping connector system to connect between a vacuum chamber and a vacuum pump such that the vacuum pump is supported by the vibration damping connector system includes a first cylindrical member and a second cylindrical member that provide a flow passage through which gas can flow from the vacuum chamber to the vacuum pump. At least one sealing member is disposed intermediate the first and second cylindrical members to provide a gas seal and a securing system securely connect the first and second cylindrical members. At least one resilient member disposed intermediate the securing system and a cylindrical member so that when the at least one sealing member is compressed by a pressure reduction caused in use by operation of the vacuum pump, the at least one resilient member can expand to enable the securing system to maintain a secure connection.

26 Claims, 9 Drawing Sheets

(51) Int. Cl.
*F16F 7/108* (2006.01)
*F04D 19/04* (2006.01)
*F04D 29/60* (2006.01)
*F16L 23/02* (2006.01)

(52) U.S. Cl.
CPC ............ *F04D 29/668* (2013.01); *F16F 7/108* (2013.01); *F16F 2226/04* (2013.01); *F16L 23/02* (2013.01)

(56) References Cited

U.S. PATENT DOCUMENTS

| | | | | |
|---|---|---|---|---|
| 4,332,404 A | * | 6/1982 | Huffman | F16L 27/04 285/227 |
| 5,516,122 A | * | 5/1996 | Caffee | F16L 23/20 285/918 |
| 8,794,678 B2 | * | 8/2014 | Quartarone | F04D 19/042 285/361 |
| 8,961,106 B2 | * | 2/2015 | Hamochi | F04D 29/668 415/119 |
| 2005/0013703 A1 | * | 1/2005 | Cafri | F04D 29/601 417/423.4 |
| 2005/0106043 A1 | | 5/2005 | Casaro et al. | |
| 2008/0023896 A1 | * | 1/2008 | Brewster | F04D 29/668 267/140.11 |
| 2011/0254263 A1 | | 10/2011 | Quartarone et al. | |
| 2012/0128484 A1 | | 5/2012 | Hamochi | |
| 2013/0121858 A1 | | 5/2013 | Sekita | |
| 2014/0197627 A1 | * | 7/2014 | Quartarone | F04D 19/042 285/50 |
| 2015/0102542 A1 | | 4/2015 | Dos Santos et al. | |

FOREIGN PATENT DOCUMENTS

| | | | | |
|---|---|---|---|---|
| GB | 2552324 A | * | 1/2018 | F04B 37/14 |
| JP | 2009174604 A | | 8/2009 | |
| JP | 2011226466 A | | 11/2011 | |
| JP | 2012112255 A | | 6/2012 | |
| JP | 2015175372 A | | 10/2015 | |

OTHER PUBLICATIONS

British Search Report dated Jan. 3, 2017, Examination Report dated Jul. 7, 2017 and Combined Search and Examination Report dated Jan. 4, 2017 for corresponding British Application No. GB1612406.7.

PCT Search Report and Written Opinion dated Aug. 21, 2017 for corresponding PCT Application No. PCT/GB2017/051362.

\* cited by examiner

VIBRATION DAMPING CONNECTOR SYSTEMS

CROSS-REFERENCE OF RELATED APPLICATION

This application is a Section 371 National Stage Application of International Application No. PCT/GB2017/052097, filed Jul. 17, 2017, and published as WO 2018/015727 A1 on Jan. 25, 2018, the content of which is hereby incorporated by reference in its entirety and which claims priority of British Application No. 1612406.7, filed Jul. 18, 2016.

FIELD

The invention relates to vibration damping connector systems to be connected between a vacuum pump and a vacuum chamber.

BACKGROUND

Vacuum pumps may be used to establish vacuum conditions in chambers or spaces within, or associated with, many types of equipment, for example, equipment used electron microscopy, spectrometry or the manufacture, repair or testing of integrated circuits. The vacuum pump may be directly connected with the piece of equipment by a connector system that puts the chamber in flow communication with the suction port of the vacuum pump. When the vacuum pump is running, vibrations induced by rotating or other moving parts of the pump may be transmitted to the attached equipment via the connector system. For example, the vacuum pump may be a turbomolecular pump that has a rotor that rotates at high speeds, for example 60,000 rpm, setting up high frequency vibrations. A turbomolecular vacuum pump may include two sources of significant vibration that establish vibrations at different frequencies. One vibration source is the pump rotor and the other is the cage of the rolling bearings that support the pump rotor. It may be necessary to eliminate, or at least substantially reduce, the vibrations transmitted from the vacuum pump to the attached equipment.

It is known to provide vibration damping in the connector system by incorporating flexible steel bellows. Damping of two different vibration frequencies may be obtained by having two different flexible bellows arranged in series. Further vibration damping may be provided by having a damping mass between the two flexible bellows. The damping mass may be in the form of an annular member of considerable mass to which opposed ends of the two flexible bellows are attached.

These known connector systems are typically not compact, which may be a problem if it is desired to fit the vacuum pump in a confined space, for example when connecting the vacuum pump to the underside of a piece of equipment. Furthermore, the relatively long flow path between the vacuum pump and vacuum chamber that results from the use of one or more flexible bellows in the connector system may increase the time necessary to establish vacuum conditions in the vacuum chamber.

The discussion above is merely provided for general background information and is not intended to be used as an aid in determining the scope of the claimed subject matter. The claimed subject matter is not limited to implementations that solve any or all disadvantages noted in the background.

SUMMARY

The invention provides a vibration damping connector system as specified in claim 1.

The invention also includes a vibration damping connector system as specified in claim 20.

The invention also includes a vibration damping connector system as specified in claim 23.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In the disclosure that follows, reference will be made to the drawings in which.

DETAILED DESCRIPTION

Figure 1:
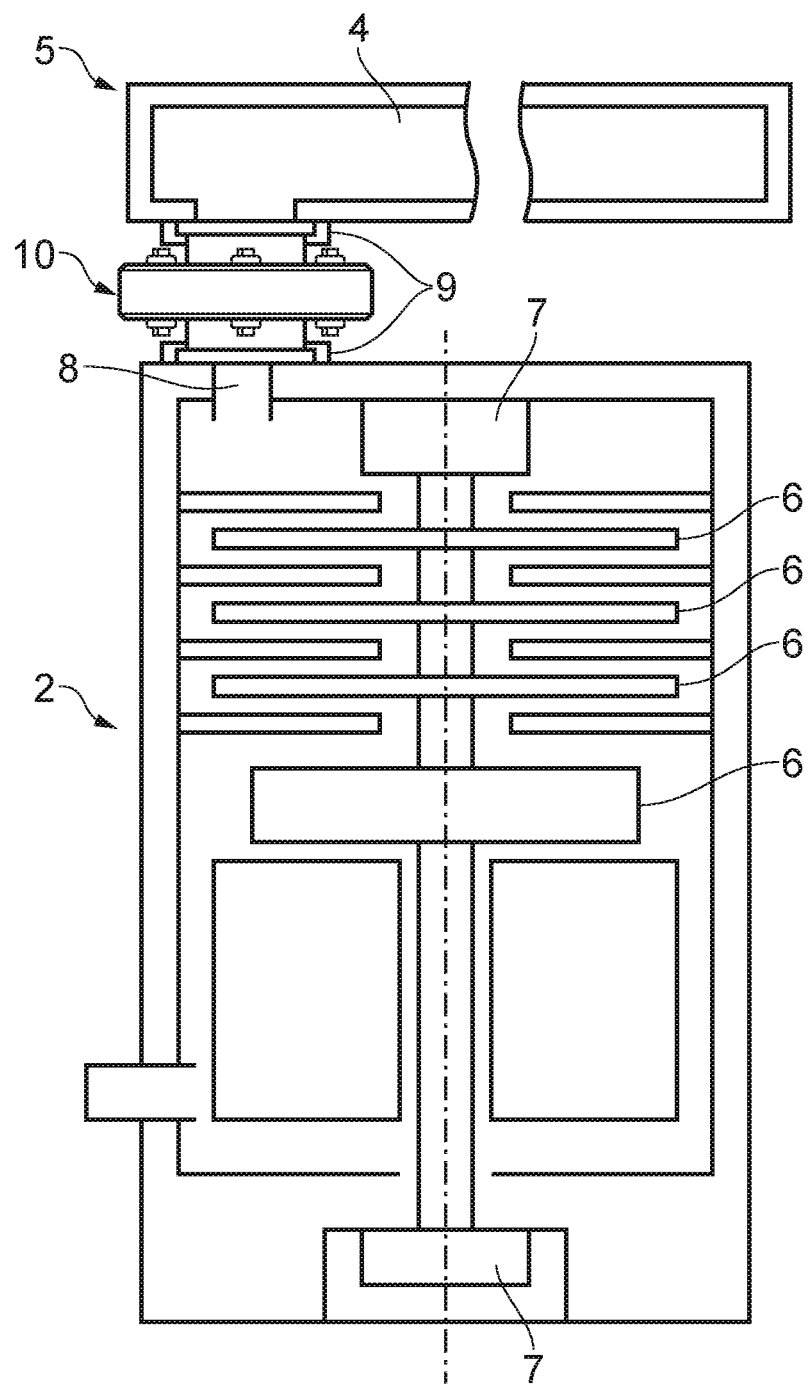
FIG. 1 is a schematic view of a vacuum pump, a vacuum chamber and a vibration damping connector system connecting the vacuum pump with the vacuum chamber.

Referring to FIG. 1, a vacuum pump 2 is connected with a vacuum chamber 4 by a vibration damping connector system 10. The vacuum pump 2 may be a turbomolecular vacuum pump having a pump rotor 6 supported by a bearing system 7 comprising at least one rolling bearing. The bearing system 7 may comprise a lower bearing in the form of a rolling bearing and an upper bearing in the form of a magnetic bearing that may be coupled with a backup in the form of a second rolling bearing. It is to be understood that the references to upper and lower bearings are not intended to be limiting and simply refer to the vacuum pump 2 in the orientation shown in FIG. 1. The suction port 8 of the vacuum pump 2 is placed in flow communication with the vacuum chamber 4 by the vibration damping connector system 10 so that the vacuum pump can be used to establish vacuum conditions in the vacuum chamber. The vacuum chamber 4 is a chamber or space in, or associated with, a piece of equipment 5 in which vacuum conditions are to be established. Such equipment may, for example, be equipment used in electron microscopy, spectrometry or the manufacture, repair or testing of integrated circuits. The piece of equipment 5 that defines the vacuum chamber 4, or with which the vacuum chamber is associated, supports the weight of the vacuum pump 2 via the vibration damping connector system 10. Thus, for example, the vacuum pump 2 may be suspended from the piece of equipment 5 via the vibration damping connector system 10.

Figure 2:
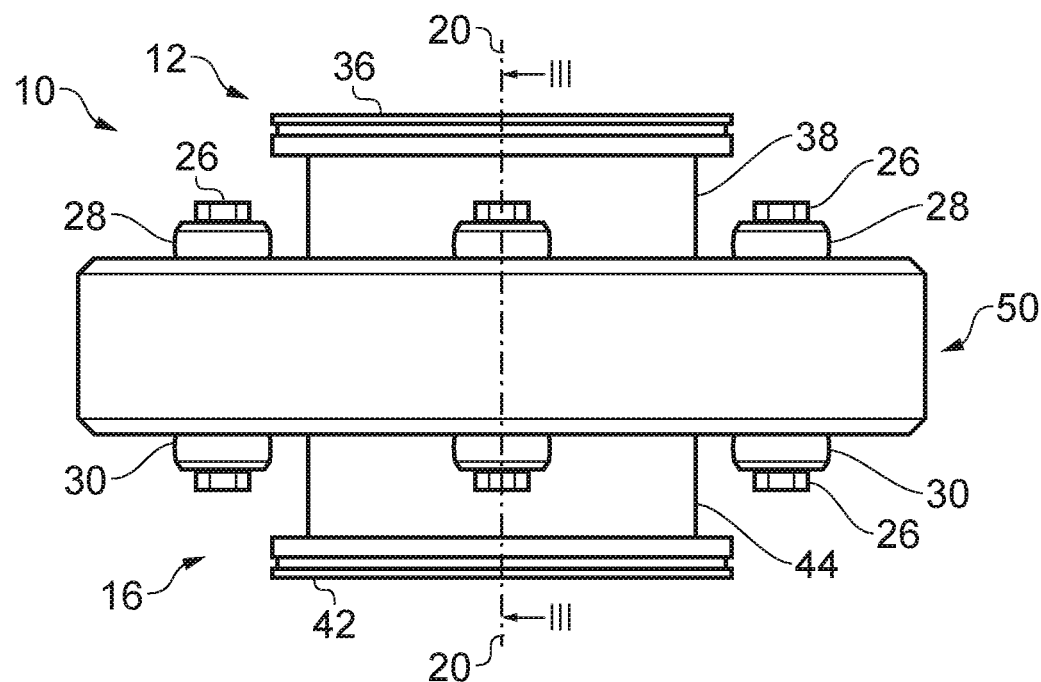
FIG. 2 is a side elevation view of the vibration damping connector system of FIG. 1.
Figure 3:
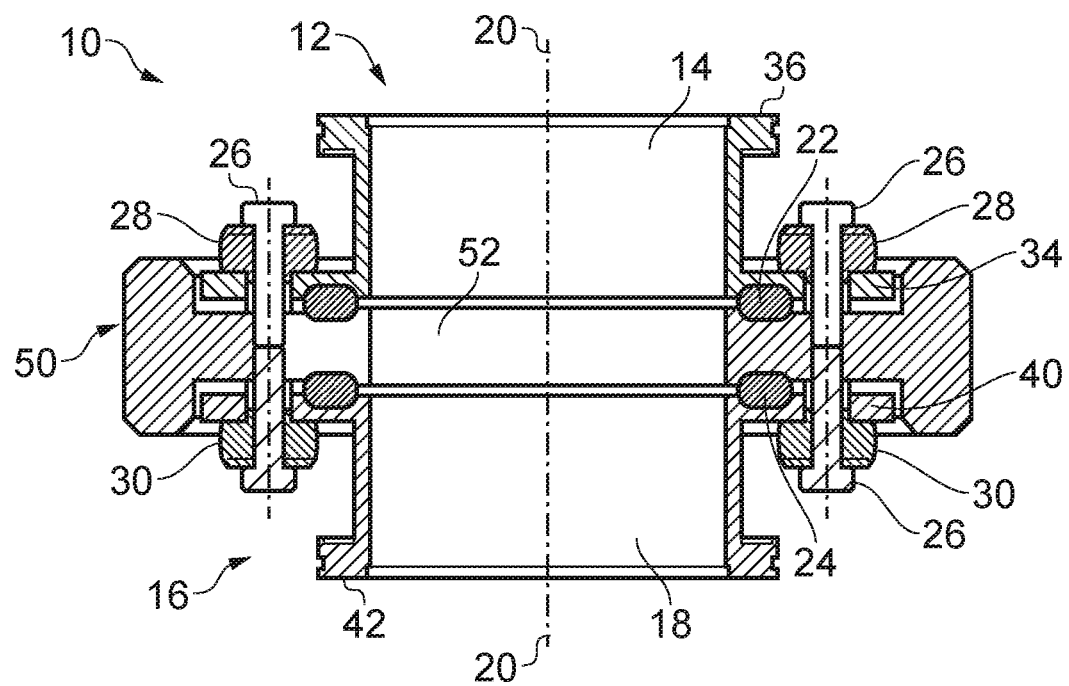
FIG. 3 is a section on line III-III of FIG. 2.
Figure 4:
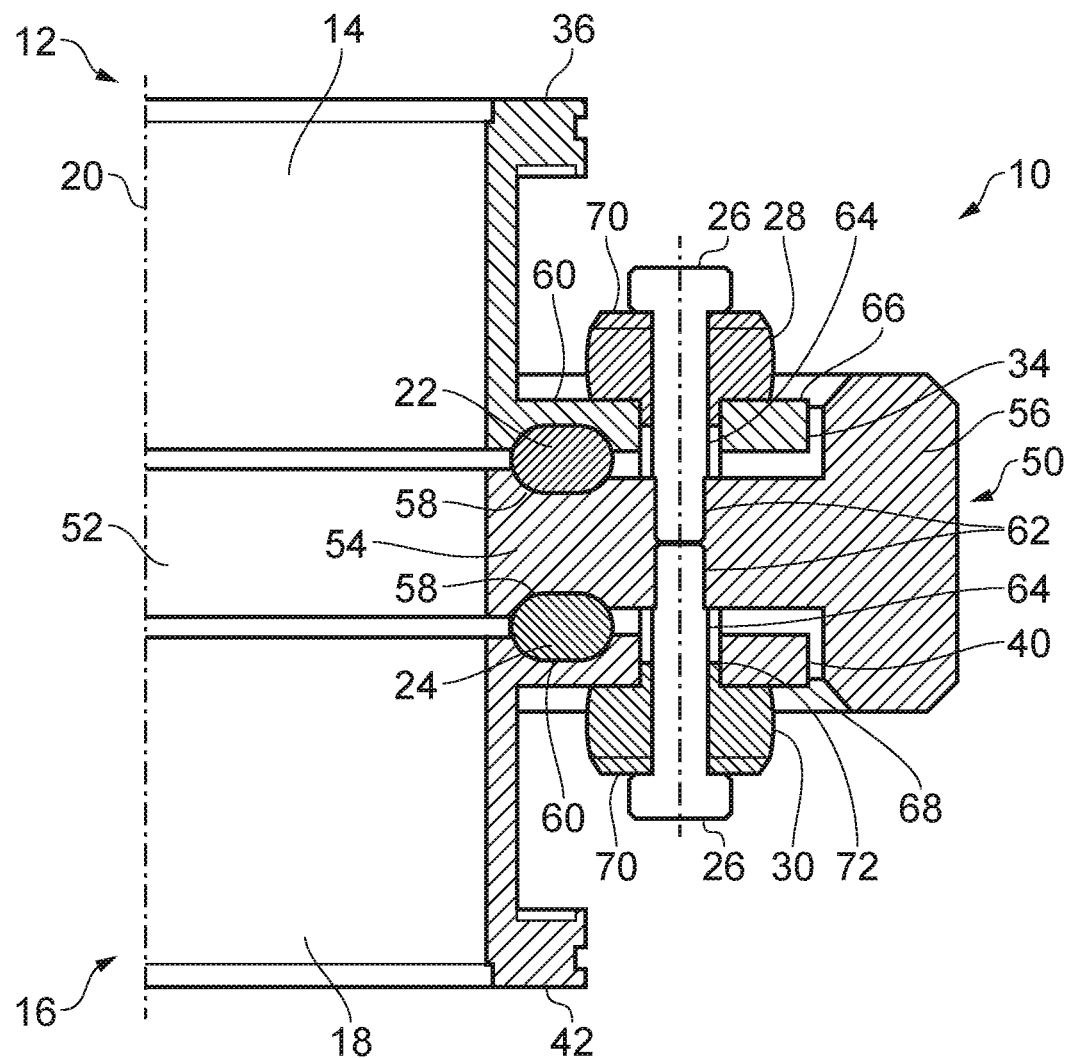
FIG. 4 is an enlargement of the right hand half of FIG. 3.

Referring to FIGS. 2 to 4, the vibration damping connector system 10 comprises a first cylindrical member 12 having a through-passage 14 and a second cylindrical member 16 having a through-passage 18. In use, as shown by way of example in FIG. 1, the first cylindrical member 12 is connected with the vacuum chamber 4 and the second cylindrical member 16 is connected with the vacuum pump 2. The through-passage 14 of the first cylindrical member 12 is in flow communication with the through-passage 18 of the second cylindrical member 16. Although not essential, the through-passages 14, 18 may each be axially aligned with the longitudinal axis 20 of the vibration damping connector system 10. First and second sealing members 22, 24 are disposed intermediate the first and second cylindrical members 12, 16 to provide respective gas seals. A securing system 26 provides a releasable secured connection of the first cylindrical member 12 with the second cylindrical member 16. Resilient members 28, 30 are disposed intermediate the securing system 26 and the first and second cylindrical members 12, 16 such that when the sealing members 22, 24 are compressed by a pressure reduction caused in use by operation of the vacuum pump 2, the resilient members 28, 30 can expand to enable the securing system to maintain the secured connection between the first and second cylindrical members. Accordingly, there should be no substantial change in the status of the security of the secured connection between the first and second cylindrical members 12, 16 when the vacuum pump 2 switches between its operating and non-operating states.

Referring to FIGS. 2 and 3, the first cylindrical member 12 may comprise a first (or inboard) end in the form of a first flange 34, a second (or outer) end in the form of a flange 36 and a tubular body 38 extending between the two flanges. Similarly, the second cylindrical member 16 may comprise a first (or inboard) end in the form of a first flange 40, a second (or outer) end in the form of a second flange 42 and a tubular body 44 extending between the two flanges. The respective first flanges 34, 40 may be larger in radial extent than the two second flanges 36, 42. The second flanges 36 42 may be industry standard vacuum flanges for securing to respective fittings on the vacuum pump 2 and vacuum chamber 4 using standard ISO clamps 9 (FIG. 1). The first and second cylindrical members 12, 16 may be made of a metal such as an aluminium alloy.

Referring to FIGS. 3 and 4, the vibration damping connector system 10 may further comprise an isolator mass 50 disposed in series with and at least partially between the first and second cylindrical members 12, 16. The isolator mass 50 is an annular body defining a through-passage 52 that may be axially aligned with the through-passages 14, 18 to define a continuous flow passage extending between the opposite ends of the vibration damping connector system 10, as represented by the second flanges 36, 42. The isolator mass 50 has a mass that is relatively large compared to the mass of the first and second cylindrical members 12, 16. The isolator mass may be made of a metal such as a stainless steel.

As best seen in FIG. 4, the isolator mass 50 comprises a relatively thinner inner annular portion 54 that is disposed between the first flanges 34, 40 and a relatively thicker outer annular portion 56 disposed radially outwardly of the respective outer peripheries of the first flanges. Positioning at least a portion, or part, of the isolator mass 50 radially outwardly of the first and second cylindrical members 12, 16 provides the potential advantage of enabling the provision of a relatively large mass to provide a desired vibration isolating function without significantly increasing the length of the vibration damping connector system 10 as consequence of the series connection of the mass with the first and second cylindrical members. In this context the length L of the vibration damping connector system 10 and thicknesses of the inner and outer annular portions 54, 56 of the isolator mass 50 are measured dimensions in the axial, or lengthways, direction of the vibration damping connector system/through-passages.

Figure 5:
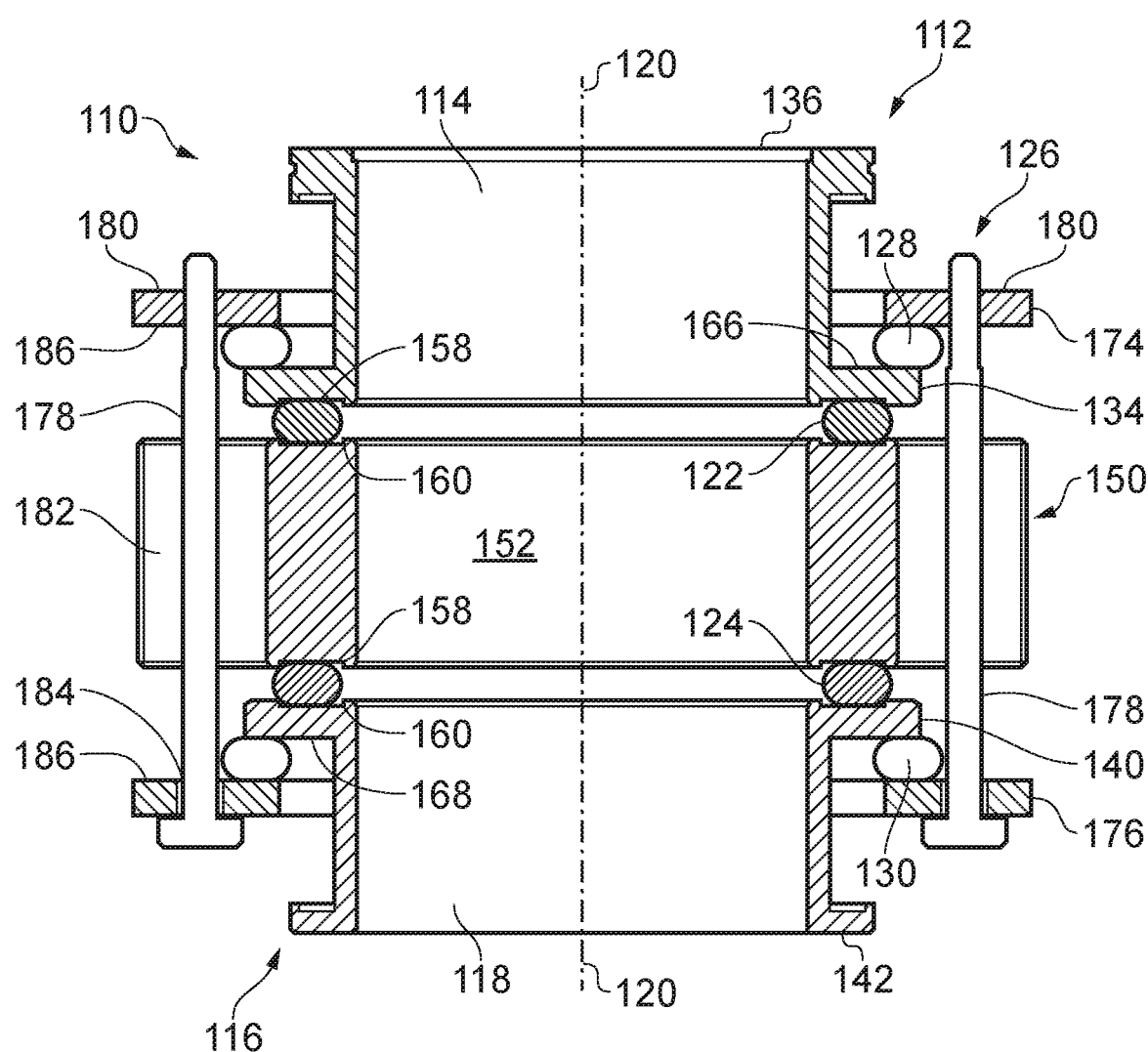
FIG. 5 is a cross-sectional side elevation of second vibration damping connector system.

The inner annular portion 54 of the isolator mass 50 defines oppositely facing annular grooves 58 and the first flanges 34, 40 define respective annular grooves 60 disposed opposite and facing the grooves 58. The facing pairs of grooves 58, 60 define a toroidal seat for the first and second sealing members 22, 24. The grooves 58, 60 may be semi-circular in cross-section to define a generally circular cross-section toroidal seat for receiving endless sealing members 22, 24 in the form of O-rings. The sealing members 22, 24 provide respective gas seals between the first and second cylindrical members 12, 16 and the isolator mass 50 so that the continuous flow passage defined by the through-passages 14, 18, 52 is gas tight. It is to be understood that it is not essential that the sealing members 22, 24 and their seat have generally circular cross sections. For example, the grooves 58, 60 may be generally rectangular so as to define substantially rectangular section toroidal seat for the sealing members 22, 24. This configuration of seat is illustrated in another vibration connector system that is shown in FIG. 5.

Still referring to FIG. 4, in this example, the securing system comprises a plurality of elongate threaded members in the form of bolts or screws 26. The inner annular portion 54 of the isolator mass 50 defines respective threaded apertures 62 to receive the bolts 26. The threaded apertures 62 may comprise partially threaded through-holes or oppositely disposed blind holes. The threaded apertures 62 are disposed radially outwardly of the grooves 58. The first flanges 34, 40 are provided with respective clearance holes 64 disposed radially outwardly of the grooves 60 such that when the first and second cylindrical members 12, 16 and isolator mass 50 are assembled, they are axially aligned with the threaded apertures 62. The through-holes 64 are sized such that the bolts 26 may pass through for insertion into the threaded apertures 62. The threaded apertures 62 and through-holes 64 may be equi-spaced on a pitch circle diameter to provide even clamping of the isolator mass 50 between the first and second cylindrical members 12, 16 when the bolts 26 are tightened.

Still referring to FIG. 4, in this example, the resilient members 28, 30 take the form of respective bushes disposed between the heads of the bolts 26 and the respective oppositely facing major faces 66, 68 of the first flanges 34, 40 that face the respective second flanges 36, 42 of the first and second cylindrical members 12, 16 so that the clamping pressure applied to the first and second cylindrical members 12, 16 by the bolts 26 is applied via the resilient members 28, 30. In some examples, the resilient members 28, 30 may comprise bushes as shown in FIGS. 3 and 4 in combination with resilient washers, which may be made of the same material as the bushes. In some examples, metal washers 70 may be disposed between the resilient members 28, 30 and the heads of the bolts 26 so that the clamping pressure exerted by the bolts is evenly distributed across the width of the resilient members. In some examples, the resilient members 28, 30 may comprise nosepieces 72 configured to engage in the through-holes 64. The nosepieces 72 may assist in locating and retaining the resilient members 28, 30 during assembly of the vibration damping connector system 10 and in providing electrical isolation of the first and second cylindrical members 12, 16 (to be described in more detail below). Providing nosepieces 72 on the resilient members 28, 30 may also provide radial vibration isolation and prevent metal to metal contact between the bolts 26 and the first flanges 134, 140.

The sealing members 22, 24 and the resilient members 28, 30 are made of a resilient material, or materials, that may be electrically insulating and may each be made of a viscoelastic material, for example an elastomer. For example, the sealing members may be made of nitrile and the resilient members may be made of supersoft urethane (SU). The selection of materials for and configuration of the viscoelastic sealing members and resilient members will be described in greater detail below.

In use, the second flange 36 of the first cylindrical member 12 is secured to the vacuum chamber 4 and second flange 42 of the second cylindrical member 16 is secured to the vacuum pump 2 to securely connect the vacuum pump to the vacuum pump and the vacuum chamber. The second flanges 36, 42 may be secured to the vacuum chamber 4 and vacuum pump 2 respectively by standard ISO clamps 9. When the vacuum pump 2 is operated to establish vacuum conditions in the vacuum chamber 4, the increasing differential between the pressure in the through-passages 14, 18, 52 and the external ambient pressure causes the sealing members 22, 24 to compress. As they compress, the sealing members 22, 24 maintain a gas seal between the first and second cylindrical members 12, 16, while the resilient members 28, 30 expand to compensate for the compression of the sealing members to maintain the tightness of the secured connection between the first and second cylindrical members that is provided by the bolts 26. Accordingly, there should be no loosening of the connection between the first and second cylindrical members 12, 16. Without the compensating expansion of the resilient members 28, 30, the connection between the first and second cylindrical members 12, 16 might be loosened, a problem that may be exacerbated by the vibrations set up in operation of the vacuum pump 2.

The electrically non-conducting sealing members 22, 28 and resilient members 28, 30 may provide an electrically insulating barrier so that the first cylindrical member 12 and second cylindrical member 16 are electrically isolated from one another. Thus, an electrically insulating barrier is provided between the vacuum pump 2 and piece of equipment 5 that defines the vacuum chamber 4, or with which the vacuum chamber is associated, regardless of the operational state of the vacuum pump.

In FIGS. 3 and 4, the securing system 26 is shown as a plurality of bolts or screws screwed into respective threaded apertures 62 provided in the isolator mass 50. This is not essential as the opposed pairs of bolts could be replaced by a nut and bolt combination and the threaded apertures 62 replaced with clearance holes provided in the isolator mass 50. In another example, instead of nuts and bolts, threaded studs with nuts at each end may be used. In yet another example, bolts could extend through clearance holes provided in one of the first flange 34, 40 and the isolator mass 50 and screw into threaded apertures provided in the other of the first flanges. However, an arrangement as shown in FIGS. 3 and 4 in which bolts or screws are screwed into threaded blind holes (or partially threaded through-holes) in the isolator mass 50 that define an end position for the bolts or screws provides the potential advantage of allowing the initial compression of the sealing members 22, 24 and resilient members 28, 30 to be controlled by the depth of the blind holes or the depth to which the threads extend in the holes. This removes the need to set a specified tightening torque for the securing system 26 and allows the vibration damping connector system 10 to be easily assembled on site using basic tools.

FIG. 5 shows a second vibration damping connector system 110. The vibration damping system 110 comprises many components that are the same as, or similar to, components of the vibration damping system 10 and to save repetition of description those parts are referenced with the same reference numeral incremented by 100 and may not be described in detail again.

The vibration damping connector system 110 comprises a first cylindrical member 112 having a through-passage 114 and a second cylindrical member 116 having a through-passage 118. In use the first cylindrical member 112 may be connected with the vacuum chamber 4 and the second cylindrical member 116 may be connected with the vacuum pump 2 in analogous fashion to the vibration damping connection system 10 shown in FIG. 1. The vibration damping connector system 110 comprises an isolator mass 150 disposed between the first and second cylindrical members 112, 116 and respective sealing members 122, 124 providing a gas seal between the first and second cylindrical members and the isolator mass.

The main differences between the vibration damping system 110 and the vibration damping system 10 are the configuration of the securing system 126 and the resilient members 128, 130. In this example, the securing system 126 comprises respective clamping rings 174, 176 associated with the first and second cylindrical members 112, 116 and a plurality of bolts, or screws, 178. In the lengthways, or axial, direction of the vibration damping connector system 110 as indicated by the longitudinal axis 120, each clamping ring 174, 176 is disposed intermediate the first and second flanges of the associated cylindrical member 112, 116 such that the clamping rings 174, 176 extend about the respective cylindrical member. The clamping rings 174, 176 may be annular members made of a relatively stiff material such as steel. The clamping ring 174 associated with the first cylindrical member 112 may be provided with a plurality of threaded apertures 180 into which the threaded ends of the bolts 178 can be screwed. The isolator mass 150 and clamping ring 176 associated with the second cylindrical member 116 have respective clearance holes 182, 184 for the bolts 178. The clearance holes 182 in the isolator mass 150 may comprise axially extending recesses, or cut outs, provided at the outer periphery of the isolator mass as shown, or bores disposed radially inwardly of the outer periphery.

It is to be understood that it is not essential that the clamping ring 174 associated with the first cylindrical member 112 has threaded apertures and that the clamping ring 176 associated with the second cylindrical member 114 has clearance holes. The arrangement of the two clamping rings 174, 176 may be the opposite way about. Furthermore, both clamping rings 174, 176 may have clearance holes for the bolts 178 and the bolts 178 may be provided with respective nuts (not shown) to provide a clamping force. In another example, instead of using nuts and bolts to provide the clamping force, a plurality of elongate threaded members in the form of studding may extend between the two clamping rings 174, 176 with each threaded member provided with respective nuts at its ends to provide the clamping force. In still another example, elongate threaded members may be fixed to one of the clamping rings 174, 176 by welding or the use of an engineering adhesive such as an anaerobic bonding agent.

The resilient members 128, 130 are disposed between the major faces 166, 168 of the first flanges 134, 140 that face the second flanges 136, 142 and the oppositely disposed major faces 186 of the clamping rings 174, 176 so that the clamping pressure applied to the first and second cylindrical members 112, 116 by the securing system 126 is applied via the resilient members 128, 130. Although not essential, in the example illustrated in FIG. 5, the resilient members 128, 130 are annular members that may be disposed adjacent the outer periphery of the respective first flanges 134, 140 and radially inwardly of the bolts 178. In other examples, the resilient members 28, 30 may take the form of pieces of resilient material disposed between the first flanges 134, 140 and the opposed clamping rings 174, 176.

The vibration damping connector system 110 shown in FIG. 5 may be modified so that it has only one clamping ring. For example, the clamping ring 174 may be omitted and the bolts 178 may screw into threaded apertures provided in the first flange 134 of the first cylindrical member 112. In a further modification, the resilient members 128, 130 may be omitted and replaced by resilient members in the form of bushes the same as, or similar to, those shown in FIGS. 2 to 4.

Figure 6:
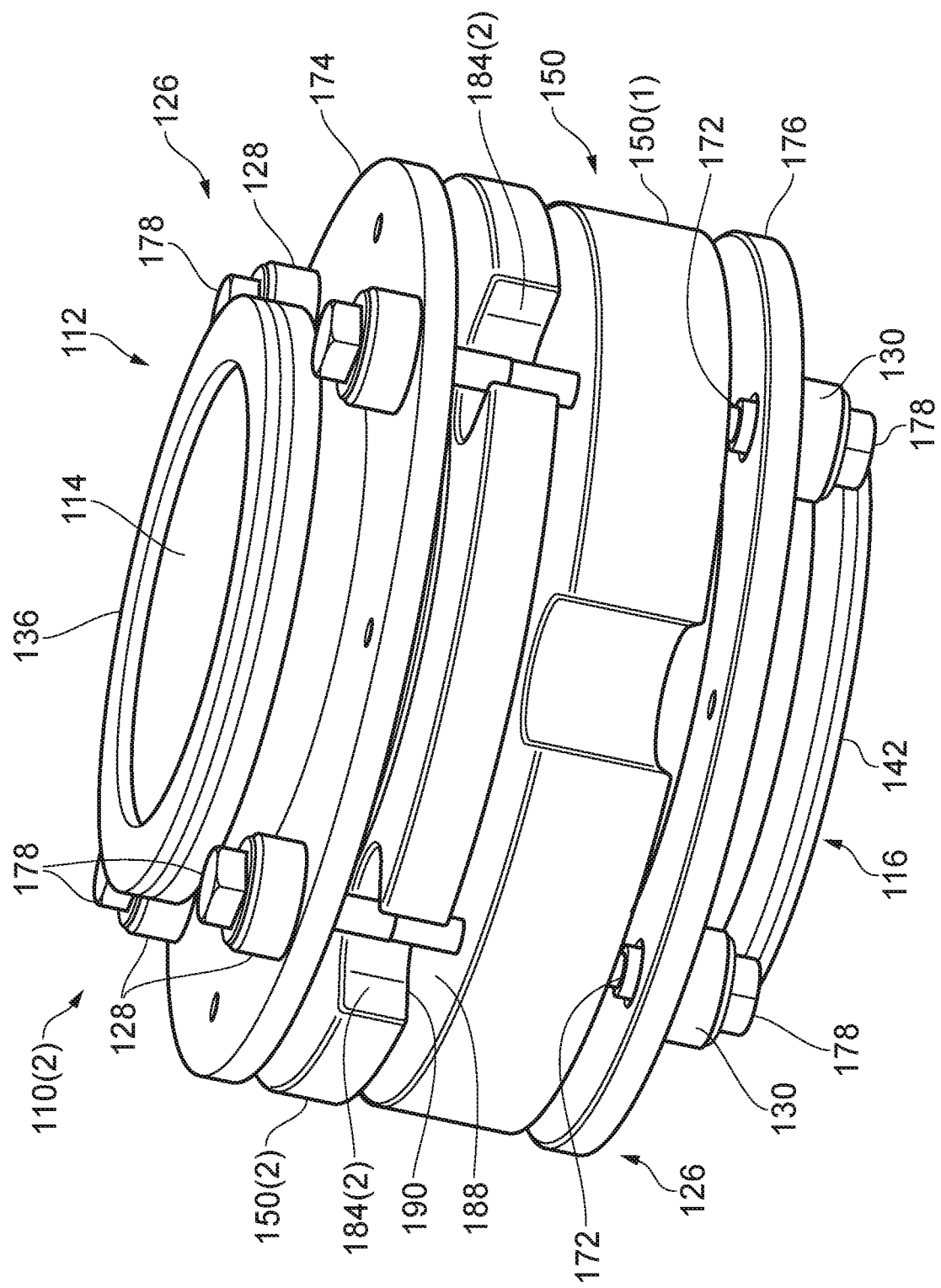
FIG. 6 is a perspective view of a third vibration damping connector system.

FIG. 6 shows a third vibration damping connector system 110(2) that is a modification of the second vibration damping connector system 110 shown in FIG. 5. To avoid repetition of description, parts of the vibration damping connector system 110(2) similar to, or the same as, parts of the vibration damping connector system 110 will be referenced with the same reference numerals and may not be described again.

The vibration damping connector system 110(2) differs from the vibration damping connector system 110 in that:
1) the securing system 126 comprises a plurality of threaded apertures (not shown) provided in the isolator mass 150 in similar fashion to the bolts 26 shown in FIG. 3;
2) the isolator mass 150 comprises a plurality of discrete bodies 150(1), 150(2); and
3) the resilient members 128, 130 are bushes disposed between the heads of the bolts 178 and the first and second clamping rings 174, 176.

Thus, in this example, the securing system 126 comprises two clamping rings 174, 176 provided with clearance holes to allow insertion of respective bolts 178 into the threaded apertures in the isolator mass 150.

The discrete bodies 150(1), 150(2) that form the isolator mass 150 may be annular members having a through passage corresponding to the through-passage 152 shown in FIG. 5 so that when the vibration damping connector system 110(2) is assembled, there is a continuous flow passage extending between the opposite ends of the vibration damping connector system as represented by the second flanges 136, 142 of the first and second cylindrical members 112, 116. The discrete bodies 150(1), 150(2) may conveniently have the same inner and outer peripheral dimensions (inner and outer diameter in examples in which the parts are circular), but a different thickness. Although not essential, in the illustrated example the discrete body 150(2) is thinner than the discrete body 150(1) and has a relatively lower mass than the discrete body 150(1). The discrete body 150(2) has respective clearance holes 184(2) through which the bolts 178 extending from the first clamping ring 174 may pass. The clearance holes 184(2) may comprise recesses provided at the outer periphery of the discrete body 150(2) as shown, or bores disposed radially inwardly of the outer periphery. In this example, the threaded apertures into which the bolts 178 are screwed are provided in the discrete body 150(1) and may be blind holes or partially threaded through-holes.

In addition to respective sealing members sealing between the first flanges of the first and second cylindrical members 112, 116 (not visible in the drawing) and the respective opposed major faces of the isolator mass 150 in the same way as the sealing members 122, 123 shown in FIG. 5, a sealing member is disposed between the opposed, or facing, major faces 188, 190 of the two discrete bodies 150(1), 150(2) to provide a gas seal between the discrete bodies. Thus the vibration damping connector system 110(2) comprises three sealing members, the additional sealing member being disposed between the discrete bodies 150(1), 150(2). Although not shown in the drawing, it is to be understood that the first flanges of the first and second cylindrical members 112, 116 and the respective opposed major faces of the two isolator masses 150, 150(2) may be provided with grooves in analogous fashion to the grooves 158, 160 shown in FIG. 5 to define seats for the respective sealing members and similarly grooves may be provided in the opposed, or facing, major faces 188, 190 of the two isolator masses to provide a seat for the sealing member disposed between the two isolator masses.

In the example shown in FIG. 6, the isolator mass 150 comprises two discrete bodies 150(1), 150(2). It is to be understood that the isolator mass 150 may in principle comprise three or more discrete bodies arranged in series to form a stack of discrete bodies with respective sealing members disposed between the first and second cylindrical members 112, 116 and the discrete bodies that form the ends of the stack and a sealing member between each adjacent pair of discrete bodies in the stack. It is to be understood that the vibration damping connector systems 10, 110 may also include an isolator mass comprising a plurality of discrete bodies in similar fashion to the vibration damping connector system 110(2).

The sealing members 122, 124 and the resilient members 128, 130 of the vibration damping connector systems 110, 110(2) are made of a resilient material, or materials, that may be electrically insulating and may each be made of an elastomer. Electrically non-conducting sealing members 122, 124 and resilient members 128, 130 provide an electrically insulating barrier so that the first cylindrical member 112 and second cylindrical member 116 are electrically isolated from one another. Thus, an electrically insulating barrier is provided between the vacuum pump and piece of equipment that defines the vacuum chamber, or with which the vacuum chamber is associated, regardless of the operational state of the vacuum pump. Furthermore, as the sealing members 122, 124 compress when the vacuum pump is in operation, the sealing members 122, 124 maintain a gas seal between the first and second cylindrical members 112, 116, while the resilient members 128, 130 expand to compensate for the compression of the sealing members to maintain the tightness of the secured connection between the first and second cylindrical members that is provided by the bolts 178. Accordingly, there should be no loosening of the connection between the first and second cylindrical members 112, 116. Without the compensating expansion of the resilient members 128, 130, the connection between the first and second cylindrical members 112, 116 might be loosened, a problem that may be exacerbated by the vibrations set up in operation of the vacuum pump.

Figure 7:
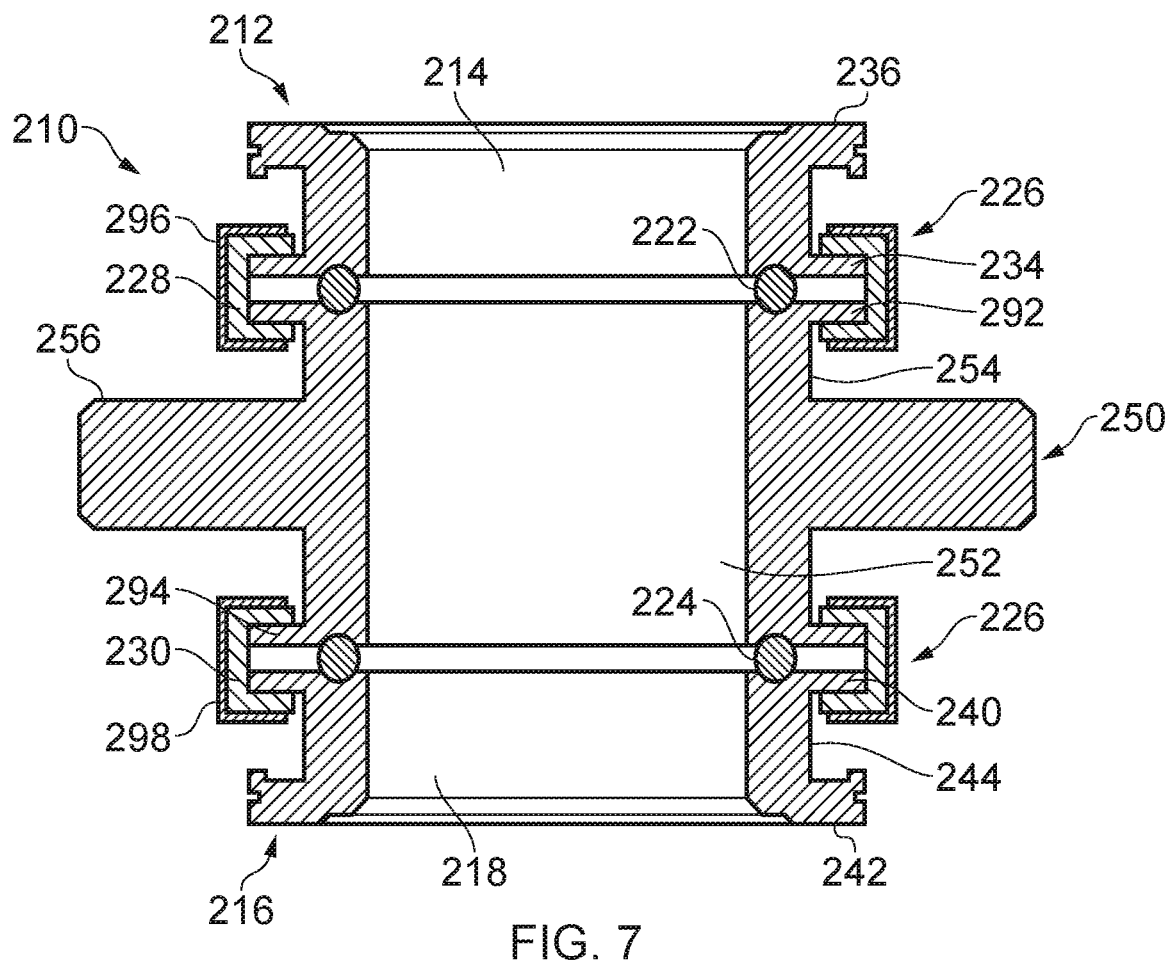
FIG. 7 is a schematic side elevation of a fourth vibration damping connector system'.

FIG. 7 shows a fourth vibration damping connector system 210. To avoid repetition of description, parts of the vibration damping connector system 210 that are the same as, or similar to, parts of the vibration damping connector system 10 are referenced by the same reference numerals incremented by 200 and may not be described again.

The vibration damping connector system 210 comprises first and second cylindrical members 212, 216 to be connected with a vacuum pump 2 and vacuum 4 in similar fashion to the first and second cylindrical members of the vibration damping connection system 10 shown in FIG. 1. The first and second cylindrical members 214, 216 define respective through-passages 214, 218. The first cylindrical member 212 comprises a first (inboard) flange 234, a second (outer) flange 236 and a tubular body 238 extending between the two flanges. The second cylindrical member 216 comprises a first (inboard) flange 240, a second (outer) flange 242 and a tubular body 244 extending between the two flanges. The vibration damping connector system 210 further comprises an isolator mass 250 disposed in series with and at least partially between the first and second cylindrical members 212, 216.

The isolator mass 250 comprises an inner annular portion 254 defining a through-passage 252, an outer mass body 256 contiguous with the inner annular portion and respective flanges 292, 294 at the ends of the inner annular portion. The through-passage 252 is aligned with the through-passages 214, 216 to define a continuous flow passage extending between the ends of the vibration damping connector system 210 as represented by the second flanges 236, 242 of the first and second cylindrical members. The upper (as viewed in the drawing) flange 292 of the isolator mass 250 is disposed in generally parallel opposed spaced apart relation with the first flange 234 of the first cylindrical member 212 and the lower flange 294 is disposed in generally parallel opposed spaced apart relation with the first flange 240 of the second cylindrical member 216. A first sealing member 222 is disposed between the flanges 234, 292 to provide a gas seal between the first cylindrical member 212 and the isolator mass 250 and a second sealing member 224 is disposed between the flanges 240, 294 to provide a gas seal between the second cylindrical member 216 and the isolator mass so that the flow passage defined by the through-passages 214, 216, 252 is gas tight throughout its length.

In this example, the securing system 226 comprises first and second clamps 296, 298. The first clamp 296 extends about the first cylindrical member 212 and is configured to clamp the first flange 234 to the upper flange 292 of the isolator mass 250, while the second clamp 298 extends about the second cylindrical member 216 and is configured to clamp the first flange 240 to the lower flange 294 of the isolator mass. A first resilient member 228 is disposed between the first clamp 296 and the first cylindrical member 212 and separates the first clamp from the first cylindrical member and the isolator mass 250. Similarly, a second resilient member 230 is disposed between the second clamp 298 and the second cylindrical member 216 to separate the second clamp from the second cylindrical member and the isolator mass 250. Although the resilient members 228, 230 may each comprise discrete resilient pieces disposed between the respective cylindrical members 212, 216 and clamps 296, 298, conveniently the resilient members comprise annular bodies, or rings.

The first and second clamps 296, 298 may take any suitable form that enables the first and second cylindrical members 212, 216 to be clamped to the isolator mass 250. The first and second clamps 296, 298 may take the form of claw clamps or other forms of clamp used in the fields of vacuum and pump technology that will be familiar to the skilled person.

It is to be understood that in principle the isolator mass 250 may comprise a plurality of discrete bodies in similar fashion to the isolator mass 150 of the vibration damping connector system 110(2) shown in FIG. 6 and that the discrete bodies of such an isolator mass may be secured one to another using clamps and interposed resilient members in at least similar fashion to the resilient members 228, 230 and clamps 296, 298.

Figure 8:
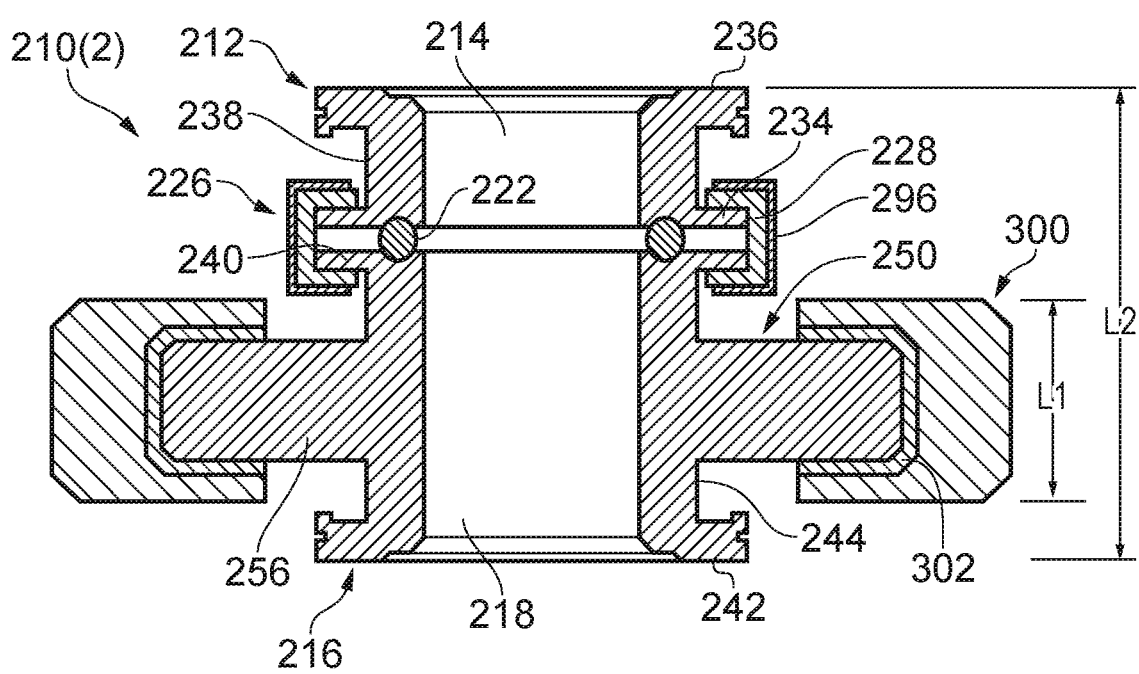
FIG. 8 is a schematic side elevation of a fifth vibration damping connector system.

FIG. 8 shows a fifth vibration damping connector system 210(2) that is a modification of the fourth vibration damping connector system 210 shown in FIG. 7. To avoid repetition of description, parts of the vibration damping connector system 210(2) the same as, or similar to, parts of the vibration damping connector system 210 will be referenced by the same reference numerals and may not be described again.

The vibration damping connector system 210(2) differs from the vibration damping connector system 210 in that it is provided with a tuned damper mass 300 and the isolator mass 250 is integral with one of the cylindrical members 212, 216, in this example, the second cylindrical member 216.

The tuned damper mass 300 is tuned to damp a predetermined vibration frequency, for example the vibration frequency of a pump rotor or cage of a rolling bearing of a vacuum pump. The tuned damper mass 300 is connected with and disposed at least in part radially outwardly of the isolator mass 250. The tuned damper mass 300 may be an annular body that surrounds the isolator mass 250. A resilient member 302 may be disposed between the isolator mass 250 and tuned damper mass 300. The resilient member 302 is engaged with and separates the isolator mass 250 from the tuned damper mass 300. The resilient member 302 may comprise a plurality of discrete resilient pieces or an annular body that completely surrounds the isolator mass 250. The tuned damper mass 300 may be secured to the isolator mass 250 by a clamp, which may be a quick acting clamp or other suitable securing means. In other examples, the tuned damper mass 300 may be configured as a clamp. For example, the tuned damper mass 300 may be a hinged body comprising two arcuate members that are provided with a securing device at their free ends or two bodies secured to one another by bolts, screws or the like as shown, by way of example in FIGS. 9 and 10.

The tuned damper mass 300 may have a length L1 at its longest point that does not exceed the length L2 of the vibration damping connector system 210(2). In the illustrated example, the length L1 is less than the distance between the first and second flanges 240, 242 of the second cylindrical member. Having the tuned damper mass 300 disposed at least partially radially outwardly of the of the isolator mass 250 provides the potential advantage of providing a vibration damping connector system with multiple vibration isolating and damping capabilities without increasing the overall length of the vibration damping connector system. Also, having an isolator mass 250 that is integral with one of the cylindrical members 216 provides the potential advantage of reducing the length L2 of the vibration damping connector system 210(2) as compared, for example, with the vibration damping connector system 210 of FIG. 7. This may be advantageous in terms of both space saving and improving the conductance of the vibration damping connector system. A further potential advantage of having an isolator mass integral with one of the cylindrical members 212, 216 is that it is possible to provide a vibration damping connector system that has only one sealing member, thereby reducing outgassing and potential leakage problems and the number of parts making up the vibration damping connector system.

The sealing members 222, 224 and the resilient members 228, 230 of the vibration damping connector systems 210, 210(2) are made of a resilient material, or materials, that may be electrically insulating and may each be made of an elastomer. Electrically non-conducting sealing members 222, 224 and resilient members 228, 230 provide an electrically insulating barrier so that the first cylindrical member 212 and second cylindrical member 216 are electrically isolated from one another. Thus, an electrically insulating barrier is provided between the vacuum pump and piece of equipment that defines the vacuum chamber, or with which the vacuum chamber is associated, regardless of the operational state of the vacuum pump. Furthermore, as the sealing members 222, 224 compress when the vacuum pump is in operation, the sealing members 222, 224 maintain a gas seal between the first and second cylindrical members 212, 216, while the resilient members 228, 230 expand to compensate for the compression of the sealing members to maintain the tightness of the secured connection between the first and second cylindrical members that is provided by the clamps 296, 298. Accordingly, there should be no loosening of the connection between the first and second cylindrical members 212, 216. Without the compensating expansion of the resilient members 228, 230, the connection between the first and second cylindrical members 212, 216 might be loosened, a problem that may be exacerbated by the vibrations set up in operation of the vacuum pump.

It is to be understood that the vibration damping connector systems 10, 110 and 210 may all be modified so that the isolator mass is integral with one of the cylindrical members. Also, each of the vibration damping connector systems 10, 110, 210, 210(2) may be provided with a tuned damper mass secured to the isolator mass in similar fashion to the tuned damper mass 300.

Figure 9:
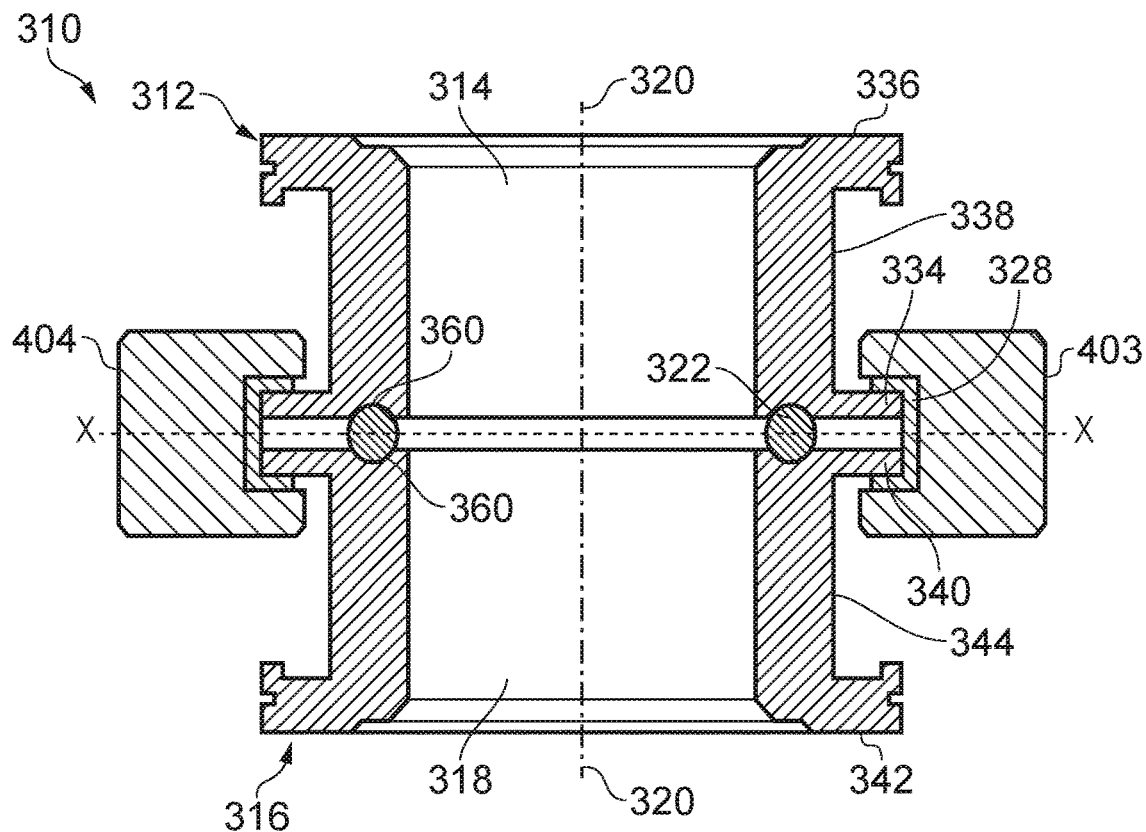
FIG. 9 is a schematic side elevation of a sixth vibration damping connector system.
Figure 10:
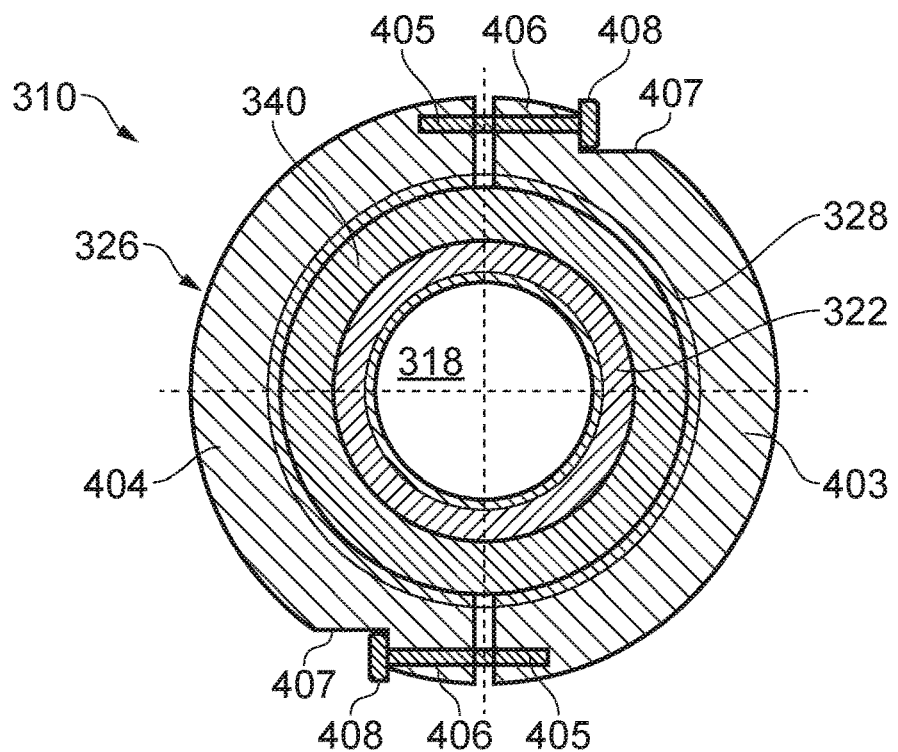
FIG. 10 is a schematic section view on line X-X in FIG. 9.

FIGS. 9 and 10 show a sixth example of a vibration damping connector system 310. The vibration damping connector system 310 comprises a first cylindrical member 312 having a through-passage 314 and a second cylindrical member 316 having a through-passage 318. In use, in the same way as the vibration damping connector system shown in FIG. 1, the first cylindrical member 312 is connected with the vacuum chamber 4 and the second cylindrical member 316 is connected with the vacuum pump 2. The through-passage 314 of the first cylindrical member 312 is in flow communication with the through-passage 318 of the second cylindrical member 316. Although not essential, the through-passages 314, 318 may each be axially aligned with the longitudinal axis of the vibration damping connector system 310. A sealing member 322 is disposed intermediate the first and second cylindrical members 312, 316 to provide a gas seal. A securing system 326 provides a releasable secured connection of the first cylindrical member 312 with the second cylindrical member 316. A resilient member 328 is disposed intermediate the securing system 326 and the first and second cylindrical members 312, 316 such that when the sealing member 322 is compressed by a pressure reduction caused in use by operation of the vacuum pump 2, the resilient member 328 can expand to enable the securing system to maintain the security of the secured connection between the first and second cylindrical members.

The first cylindrical member 312 may comprise a first (or inboard) end in the form of a first flange 334, a second (or outer) end in the form of a flange 336 and a tubular body 338 extending between the two flanges. Similarly, the second cylindrical member 316 may comprise a first (or inboard) end in the form of a first flange 340, a second (outer) end in the form of a second flange 342 and a tubular body 344 extending between the two flanges. The respective first flanges 334, 340 may be larger in radial extent than the two second flanges 336, 342. The second flanges 336 342 may be industry standard vacuum flanges for securing to respective fittings on the vacuum pump 2 and vacuum chamber 4 using standard ISO clamps 9 in the same, or similar, fashion to the vibration damping connector system 10 shown in FIG. 1.

The securing system 326 is configured as a tuned damper mass tuned to damp a predetermined vibration frequency, for example the vibration frequency of a pump rotor or a cage of a rolling bearing of a vacuum pump. The securing system 326 comprises two arcuate bodies 403, 404 that are configured to surround the first flanges 334, 340 of the first and second cylindrical members 312, 316. Each arcuate body 403, 404 is provided with a threaded aperture 405 at one end and a clearance hole 406 at the other. A recess 407 defining a seat for a bolt, or screw, 408 is provided at the outer end of each clearance hole 406. When the arcuate bodies 403, 404 are fitted about the first and second flanges 334, 340, they may be positioned such that the threaded apertures 405 of each are disposed opposite and in line with the clearance hole 406 of the other to allow insertion of the bolts 408 into the threaded apertures 405 via the oppositely disposed clearance holes. The bolts 408 may then be tightened so that the arcuate bodies 403, 404 are drawn towards one another to tightly clamp the first flanges 334, 340 together. The resilient member 328 is disposed between the first flanges 334, 340 and the arcuate bodies 403, 404 so that the flanges are separated, or isolated, from the arcuate bodies by the resilient member. The resilient member 328 may comprise a plurality of discrete resilient pieces spaced about the outer periphery of the first flanges 334, 340 or an annular member that completely surrounds the flanges. The mass of the two arcuate bodies 403, 404 is selected so as to enable the securing system 326 to function as a damping mass tuned to damp a predetermined vibration frequency, or frequencies.

In the illustrated example, the two arcuate bodies 403, 404 are secured to one another by means of the bolts 408 to form a clamp operable to secure the first and second cylindrical members 312, 316 together. It is to be understood that the combined securing system-tuned damping mass may take other forms. For example, instead of having threaded apertures, the arcuate bodies 403, 404 may be provided with clearance holes 406 and seat-defining recesses 407 at both ends to allow securing by means of a nut and bolt combination or an elongate threaded member in the form of a length of studding with a nut at each end. Alternatively, each arcuate body may have a fixed elongate threaded member provided at one end and a clearance hole at the other. An elongate threaded member may be fixed to the arcuate bodies 403, 404 by, for example, welding or an engineering adhesive such as an anaerobic bonding agent. In other examples, the arcuate bodies 403, 404 may be hinge connected at one end and provided with cooperable securing elements at their free (other) ends that can be operated to draw the two arcuate bodies together to provide a quick-clamping action.

It is to be understood that in principle, a further tuned damper mass and interposing resilient member may be fitted to the securing system 326 so as to be disposed at least partially radially outwardly of the securing system 326. In this way, a series of tuned damper masses may be provided to damp different vibration frequencies. Having a plurality tuned damper masses disposed successively radially outwardly of the first flanges 334, 340 and each having a length L1 less than the overall length L2 of the vibration damping connector system 310 allows the provision of multiple vibration damping capabilities in a compact arrangement that does not increase the length of the vibration damping connector system. Furthermore, since only one sealing member 324 is required, outgassing problems are reduced and the overall relatively short length of the vibration damping connector system made possible by having the tuned damper masses extend about the first and second cylindrical members 312, 316 provides the possibility of improved conductance.

The sealing member 322 and the resilient member 328 of the vibration damping connector system 310 are made of a resilient material, or materials, that may be electrically insulating and may each be made of an elastomer. An electrically non-conducting sealing member 322 and resilient member 328 provide an electrically insulating barrier so that the first cylindrical member 312 and second cylindrical member 316 are electrically isolated from one another. Thus, an electrically insulating barrier is provided between the vacuum pump and piece of equipment that defines the vacuum chamber, or with which the vacuum chamber is associated, regardless of the operational state of the vacuum pump. Furthermore, as the sealing member 322 compresses when the vacuum pump is in operation it maintains a gas seal between the first and second cylindrical members 312, 316, while the resilient member 328 expands to compensate for the compression of the sealing member to maintain the tightness of the secured connection between the first and second cylindrical members that is provided by securing system 326. Accordingly, there should be no loosening of the connection between the first and second cylindrical members 312, 316. Without the compensating expansion of the resilient member 328, the connection between the first and second cylindrical members 312, 316 might be loosened, a problem that may be exacerbated by the vibrations set up in operation of the vacuum pump.

Vacuum pumps tend to produce background vibrations spread over a relatively wide range of frequencies that may not be attributable to any one part of the pump and certain vibrations with relatively narrow frequency ranges that are attributable to specific components, for example the pump rotor or cage of a rolling bearing. Also certain pieces of equipment, for example microscopes, may be susceptible to vibrations at particular frequencies. The vibration damping connector systems described above may provide vibration isolating or damping functionality that does one or both of isolating the equipment attached to the vacuum pump from the background vibrations by reducing the transmission of vibrations above a resonant frequency and damping vibrations at relatively narrower targeted frequencies by dissipating the vibration energy.

Figure 11:
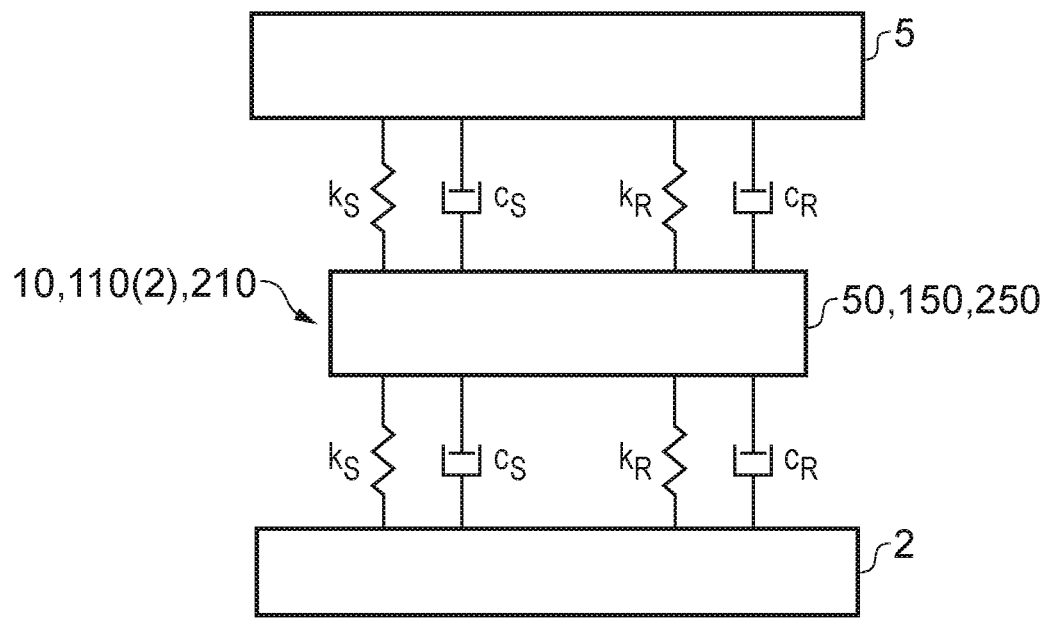
FIG. 11 is a schematic illustration of the vibration damping connector systems of FIGS. 2, 6 and 7 connecting a vacuum pump with a vacuum chamber.
Figure 12:
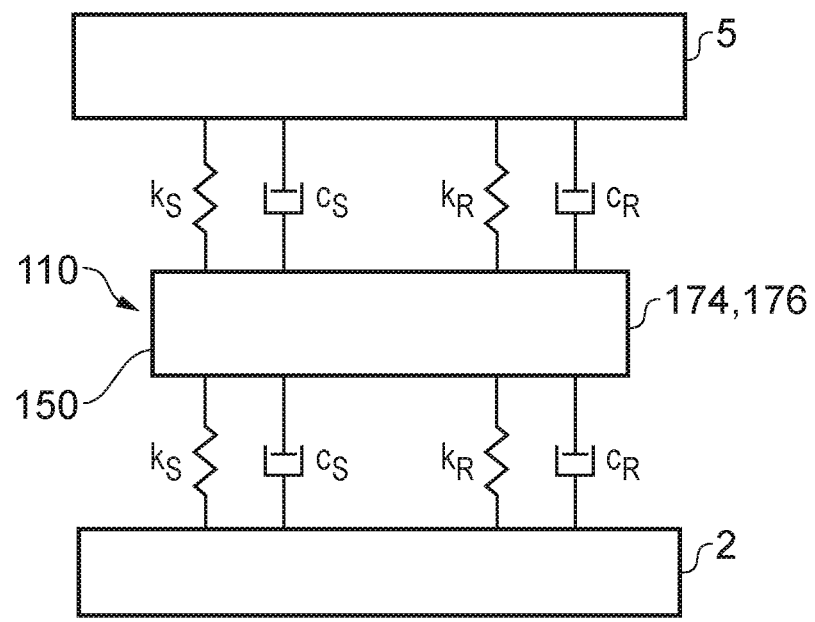
FIG. 12 is a schematic illustration of the vibration damping connector system of FIG. 5 connecting a vacuum pump with a vacuum chamber.
Figure 13:
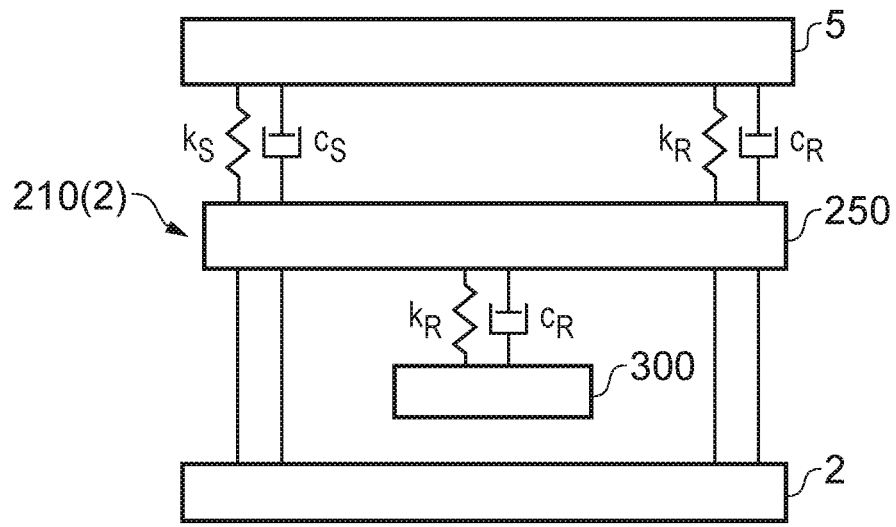
FIG. 13 is a schematic illustration of the vibration damping connector system of FIG. 8 connecting a vacuum pump with a vacuum chamber.

FIGS. 11 to 14 are schematic illustrations of vibration damping connector system structures the same as or similar to the vibration damping connector system structures of FIGS. 2 to 10 in use connecting a vacuum pump 2 to a piece of equipment 5 defining, or associated with, a vacuum chamber. FIGS. 11 and 12 illustrate vibration damping connector system structures like the vibration damping connector systems 10, 110, 110(2), 210 illustrated by FIGS. 2 to 7 that have an isolator mass disposed in series with the first and second cylindrical members. FIG. 13 shows a vibration damping connector system structure like the vibration damping connector system 201(2) of FIG. 8 with an isolator disposed in series with the first and second cylindrical members and a tuned damper mass secured to the isolator mass. In each case there is at least one sealing member having a spring constant $k_S$ and a damping ratio $c_S$ and at least one resilient member having a spring constant $k_R$ and a damping ratio $c_R$. The isolator mass, at least one resilient member and at least one sealing member constitute a vibration isolating system that is configured to isolate the piece of equipment 5 from the background vibrations emitted by the vacuum pump 2. The isolator mass has a mass that is relatively substantially larger than the mass of the first and second cylindrical members.

In order to maximise the efficacy of the vibration isolating systems built into the vibration damping connector systems, the resonant frequency should be set as low as possible so as to reduce the transmission of vibration frequencies above the resonant frequency. Thus, the vibration isolating system should be configured to set its resonant frequency at least below the dominant vibration frequencies in the range of frequencies of the background vibrations emitted by the vacuum pump. In addition to selecting a suitable mass for the isolator mass, performance of the vibration isolating system may be optimised by minimising the spring constant $k_S$ and damping ratio $c_S$ of the or each sealing member and configuring the or each resilient sealing member so that the transmission path through the at least one resilient member and the securing system offers a lower resistance to the transmission of mechanical energy than the path through the or each sealing member and the isolator mass. In this way, the majority of the vibration energy is transmitted through the isolator mass and the characteristics of the isolator mass and or each sealing member dominate vibration isolation performance.

In effect, the properties of the or each resilient member should be set to provide sufficient resistance to compression to support the weight of the vacuum pump without compression set, but less resistance to compression than is provided by the or each sealing member. To this end, the or each resilient member and the or each sealing member are configured such that in non-vacuum conditions for a predetermined pump weight the percentage squeeze on the or each one resilient member is greater than or equal to the percentage squeeze on the or each sealing member when under vacuum. In some examples, the or each resilient member and the or each sealing member are configured such that in non-vacuum conditions for a predetermined pump weight the percentage squeeze on the or each one resilient member is 1.25 to 1.5 times greater the percentage squeeze on the or each sealing member when under vacuum. In presently preferred examples, the percentage squeeze on the or each sealing member when under vacuum is 10% to 20%. Furthermore, the efficacy of the vibration isolation system is optimised by making the or each resilient member from a material having a modulus of elasticity such that the spring constant $k_R$ of the or each resilient member is less than the spring constant $k_S$ of the or each sealing member.

The percentage squeeze of the or each sealing member under vacuum is determined by the gas load due to differential pressure and the spring constant $k_S$ of the or each sealing member. In order to optimise the performance of the vibration isolating system it is necessary to minimise the spring constant $k_S$. If the sealing member material is chosen such that the percentage squeeze is 10% to 20% under vacuum, a good gas seal should be obtained whilst minimising the spring constant $k_S$. For example, a sealing member with an internal diameter of between 75 mm and 110 mm suitable for use in a vibration damping connector systems for vacuum pumps with a flange inside diameter less than or equal to 100 mm (ie ISO100), the gas load is between 440 N and 950 N. For a 12 mm diameter sealing member a squeeze percentage of 10% to 20% requires a spring constant $k_S$ between 360 N/mm and 790 N/mm. The spring constant $k_S$ of the sealing member may be determined by the cross-sectional diameter of the sealing member, the circumference of the sealing member and the modulus of elasticity of the material from which it is made. The shore hardness is a function of the modulus of elasticity of the material. For the 12 mm diameter sealing member discussed here, the spring constant $k_S$ requirements are met by a 50 shore hardness elastomer.

As indicated above, the efficacy of the vibration isolation system may be optimised by minimising the damping ratio $c_S$ of the material from which the or each sealing member is made. Presently preferred materials may have a damping ratio $\xi$ less than or equal to 0.2 (loss factor $\eta$ less than or equal to 0.4) with a value of $\xi$ less than or equal to 0.1 ($\eta$ less than equal to 0.2) being preferred. An example of a material which meets these requirements along with suitable mechanical and vacuum properties is Nitrile butadiene rubber (also known as Nitrile, NBR. Buna-N, Perbunan, acrylonitrile butadiene rubber).

Figure 14:
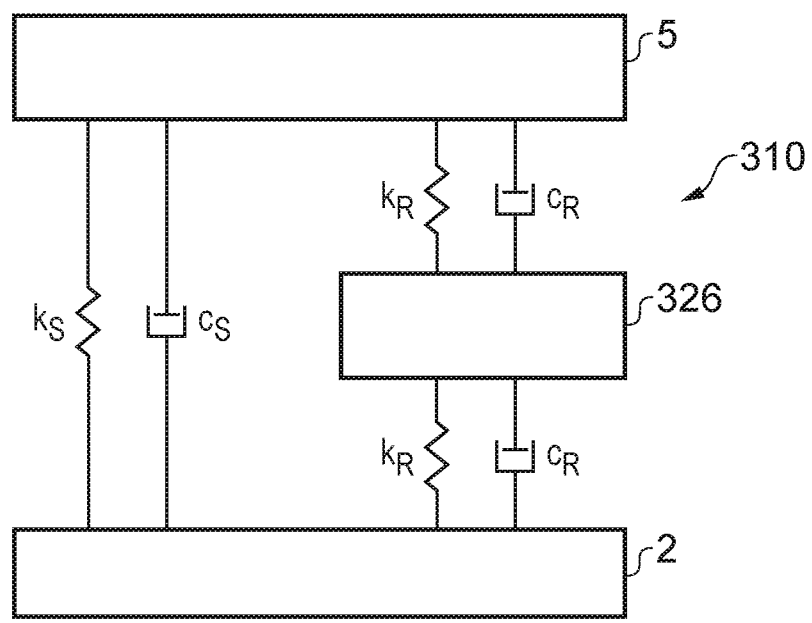
FIG. 14 is a schematic illustration of the vibration damping connector system of FIGS. 9 and 10 connecting a vacuum pump with a vacuum chamber.

FIG. 14 illustrates a vibration damping connector system like that shown in FIGS. 9 and 10 that provides a degree of vibration isolation. This vibration damping connector system has tuned damper mass that is mounted parallel to the first and second cylindrical members. In effect the tuned damper mass hangs off of the first and second cylindrical members. The weight of the tuned damper mass is selected to target specific frequencies of concern, for example, the bearing cage frequencies or harmonics of the rotor frequency. While a vibration damping connector system with a tuned damper mass as illustrated by FIG. 14 may provide some useful vibration isolation, it is more limited in effect than the vibration damping connector systems with an in series isolator mass shown illustrated by FIGS. 11 to 13. It may be desirable to combine the two techniques to provide a vibration damping connector system with a vibration damping connector system having an in-series isolator mass that is configured to isolate the background vibrations and one or more tuned damper masses to target specific vibrations that may be of concern. This possibility is illustrated by FIGS. 8 and 13, which show a tuned damper mass attached to an in-series isolator mass.

While not limited to these combinations of materials, the or each sealing member may be made of nitrile butadiene rubber (also known as Nitrile, NBR, Buna-N, Perbunan, acrylonitrile butadiene rubber) while the or each resilient member may be made of supersoft urethane (SU), neoprene, natural rubber, nitrile or a fluoroelastomer. In some examples, the or each resilient member may comprise a suitable spring or springs. Although the use of a spring or springs is not currently preferred (as it potentially reduces the scope for producing a compact connector system, and without at least one resilient member made of an electrically insulating material, the benefit of having an electrically insulating barrier between the first and second cylindrical members may be lost) using springs provides the possibility of having resilient members with a lower spring constant $k_S$ and damping ratio $c_S$.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vibration damping connector system to connect between a vacuum chamber and a vacuum pump such that the vacuum pump is supported by the vibration damping connector system, said connector system comprising:
a first cylindrical member having a through-passage to connect with said vacuum chamber;
a second cylindrical member having a through-passage to connect said through-passage of said first cylindrical member with said vacuum pump;
at least one sealing member disposed intermediate said first and second cylindrical members to provide a gas seal;
a securing system to provide a releasable secured connection of said first cylindrical member with said second cylindrical member; and
at least one resilient member disposed intermediate said securing system and a said cylindrical member such that when said at least one sealing member is compressed by a pressure reduction caused in use by operation of said vacuum pump, said at least one resilient member can expand to enable said securing system to maintain said secured connection;
wherein said at least one resilient member and said at least one sealing member are configured such that in non-vacuum conditions for a predetermined vacuum pump weight the percentage squeeze on said at least one resilient member is greater than or equal to the percentage squeeze on said at least one sealing member when under vacuum.

2. The vibration damping connector system as claimed in claim 1, wherein said at least one sealing member has a spring constant $k_S$ and said at least one resilient member has a spring constant $k_R$ that is less than said spring constant $k_S$.

3. The vibration damping connector system as claimed in claim 1, further comprising an isolator mass connected in series with and disposed at least partially between said first and second cylindrical members, wherein respective said sealing members are disposed between said isolator mass and said first and second cylindrical members to provide respective said gas seals.

4. The vibration damping connector system as claimed in claim 3, wherein said isolator mass comprises a plurality of discrete bodies disposed in series and a said sealing member is disposed between adjacent said discrete bodies to provide said gas seal between said adjacent discrete bodies.

5. The vibration damping connector system as claimed in claim 3, wherein said securing system comprises a plurality of elongate threaded members operable to draw said first and second cylindrical members together.

6. The vibration damping connector system as claimed in claim 5, wherein said sealing members define respective sealing planes and said elongate threaded members each extend through at least one said sealing plane.

7. The vibration damping connector system as claimed in claim 3, wherein said securing system comprises a plurality of first elongate threaded members operable to clamp said first cylindrical member to said isolator mass and a plurality of second elongate threaded members operable to clamp said second cylindrical member to said isolator mass.

8. The vibration damping connector system as claimed in claim 7, wherein said isolator mass defines respective holes to receive said first and second elongate threaded members, a length of each hole being threaded and the threaded holes being configured to define an end position for said first and second elongate threaded members to define a desired clamping pressure to be applied to said first and second cylindrical members by said first and second elongate threaded members to preload said at least one resilient member and said sealing members.

9. The vibration damping connector system as claimed in claim 3, wherein said securing system comprises first and second clamps extending about said first and second cylindrical members respectively to clamp said first and second cylindrical members to said isolator mass and a first said resilient member is disposed between said first clamp and said first cylindrical member to separate said first clamp from said first cylindrical member and said isolator mass and a second said resilient member is disposed between said second clamp and said second cylindrical member to separate said second clamp from said second cylindrical member and said isolator mass.

10. The vibration damping connector system as claimed in claim 3, further comprising a tuned damper mass tuned to damp a predetermined vibration frequency, wherein said tuned damper mass is securable to said isolator mass in a position in which it is disposed at least partially radially outwardly of said isolator mass.

11. The vibration damping connector system as claimed in claim 10, wherein said tuned damper mass has a length L1, said first and second cylindrical members and said isolator mass have respective lengths and the sum of said respective lengths L2 is greater than said length L1.

12. The vibration damping connector system as claimed in claim 1, further comprising an isolator mass that is integral with one of said first and second cylindrical members.

13. The vibration damping connector system as claimed in claim 1, further comprising a tuned damper mass secured to said first and second cylindrical members, said tuned damper mass being tuned to damp a predetermined vibration frequency of said vacuum pump and disposed radially outwardly of said first and second cylindrical members.

14. The vibration damping connector system as claimed in claim 1, wherein said securing system comprises a clamp that has a mass tuned to damp a predetermined vibration frequency of said vacuum pump.

15. A vibration damping connector system to be connect between a vacuum chamber and a vacuum pump, said connector system comprising:
a first cylindrical member having a through-passage to connect with said vacuum chamber;
a second cylindrical member having a through-passage said through-passage of said first cylindrical member with said vacuum pump;
an isolator mass connected between and in series with and at least partially between said first and second cylindrical members;
respective sealing members disposed between said first and second cylindrical members and said isolator mass to provide respective gas seals; and
a tuned damper mass tuned to damp a predetermined vibration frequency, said tuned damper mass being connected with and disposed radially outwardly of said isolator mass; and
an elastomer isolator disposed between and in engagement with said first mass and tuned damper mass.

16. The vibration damping connector system as claimed in claim 15, further comprising respective elastomeric isolators disposed between and in engagement with said first isolator mass and said first and second cylindrical members.

17. The vibration damping connector system as claimed in claim 16, further comprising an isolator mass connected in series with and at least partially between said first and second cylindrical members, wherein:
said at least one elastomeric isolator comprises a first elastomeric isolator and a second elastomeric isolator;
a first flange is provided on said first cylindrical member, a second flange is provided on said second cylindrical member, a third flange is provided on said isolator mass, and a fourth flange is provided on said isolator mass; and
said securing system comprises a first clamp and a second clamp wherein said first clamp secures said first flange to said third flange and said first elastomeric isolator separates said first clamp from said first and third flanges and wherein said second clamp secures said second flange to said fourth flange and said second elastomeric isolator separates said second clamp from said second and fourth flanges.

18. The vibration damping connector system as claimed in claim 17, wherein there are respective said sealing members sealing between said first and third flanges and said second and fourth flanges.

19. The vibration damping connector system as claimed in claim 17, further comprising a tuned damper mass tuned to damp a predetermined vibration frequency of said vacuum pump secured to said isolator mass, said tuned damper mass extending about said isolator mass and being separated from said isolator mass by an elastomeric isolator disposed between and engaging said isolator mass and said tuned damper mass.

20. A vibration damping connector system to connect between a vacuum chamber and a vacuum pump, said connector system comprising:
a first cylindrical member having a through-passage to connect with said vacuum chamber;
a second cylindrical member having a through-passage to connect said through-passage of said first cylindrical member with said vacuum pump;
at least one sealing member disposed intermediate said first and second cylindrical members to provide a gas seal;
a securing system to provide a releasable secured connection between said first and second cylindrical members; and
at least one elastomeric isolator positioned between the securing system and the first cylindrical member and between the securing system and the second cylindrical member wherein the at least one elastomeric isolator is external of the gas seal,
wherein said at least one sealing member and said at least one elastomeric isolator are arranged to provide electrical isolation between said first and second cylindrical members.

21. The vibration damping connector system as claimed in claim 20, wherein said securing system comprises a first clamp securing a first flange to a second flange and said at least one elastomeric isolator separates said first clamp from said first and second flanges.

22. The vibration damping connector system as claimed in claim 21, wherein said first clamp has a mass tuned to damp a predetermined vibration frequency of said vacuum pump.

23. The vibration damping connector system as claimed in claim 21, wherein said first clamp comprises an annular member comprising at least two separable sections joined by at least one threaded securing member.

24. A vibration damping connector system to connect between a vacuum chamber and a vacuum pump, said connector system comprising:
- a first cylindrical member having a through-passage, a first end and a second end, said second end to connect with said vacuum chamber;
- a second cylindrical member having a through-passage, a first end and a second end, said second end to connect with said vacuum pump with said first end disposed in facing relationship with said first end of said first cylindrical member and said through-passage in flow communication with said through-passage of said first cylindrical member;
- a sealing member engaging said first ends to provide a gas seal between said first ends; and
- a securing device releasably securing said first cylindrical member to said second cylindrical member,
- wherein said sealing member defines a sealing plane and said securing device extends about said first ends in said sealing plane and has a mass tuned to damp a predetermined vibration frequency; and
- wherein said securing device comprises a plurality of arcuate sections disposed in end to end relationship.

25. The vibration damping connector system as claimed in claim 24, wherein said securing device comprises two said arcuate sections secured at said ends by respective threaded members extending between said ends.

26. A method of manufacturing a vibration damping connector system to connect between a vacuum chamber and a vacuum pump such that the vacuum pump is supported by the vibration damping connector system, wherein
- said vibration damping connector system comprises a first cylindrical member to connect with said vacuum chamber, a second cylindrical member to connect with said vacuum pump, an isolator mass in series with and at least partially disposed between said first and second cylindrical members, a securing system to provide a releasable secured connection of said first and second cylindrical members, at least one resilient member disposed intermediate said securing system and at said cylindrical member and a plurality of sealing members sealing between said first and second cylindrical members and said isolator mass, and
- said method comprises determining the weight of said vacuum pump and configuring said at least one resilient member and said sealing members such that in non-vacuum conditions the percentage squeeze on said at least one resilient member is greater than or equal to the percentage squeeze on said sealing members when under vacuum.

\* \* \* \* \*